Dec. 4, 1951 J. F. VASSELIN 2,577,547
SHEAVE CONSTRUCTION
Filed Sept. 17, 1948 2 SHEETS—SHEET 1
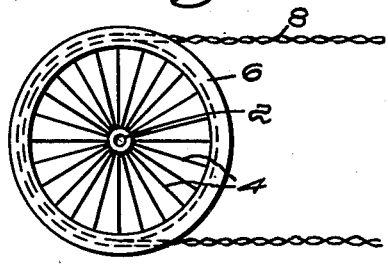
Fig. 1.
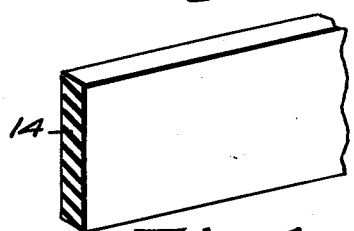
Fig. 2.
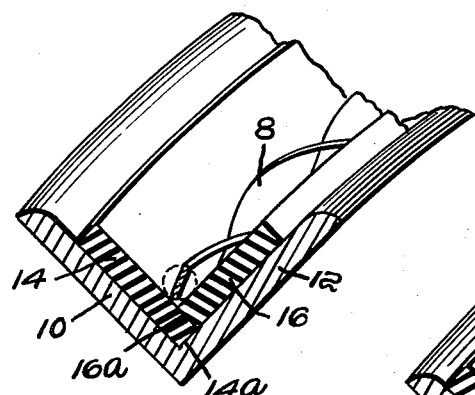
Fig. 3.
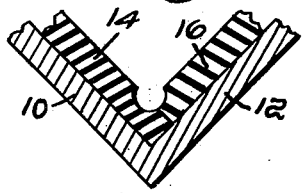
Fig. 4.
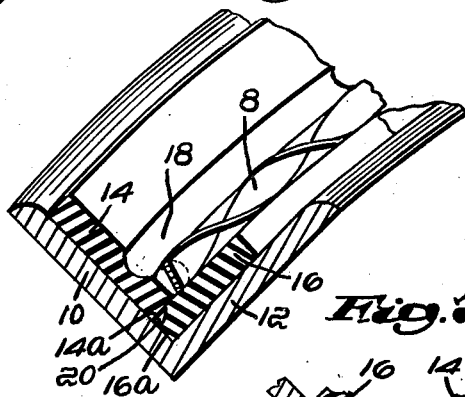
Fig. 5.
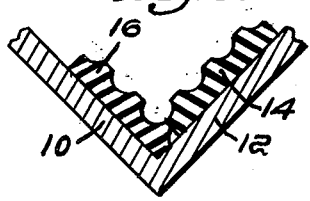
Fig. 6.
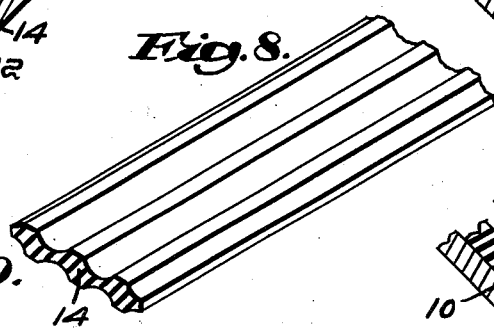
Fig. 8.
Fig. 10.
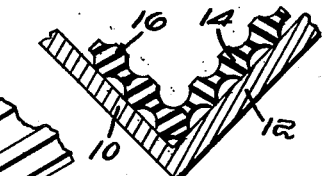
Fig. 7.
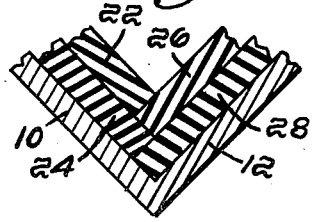
Fig. 9.
Inventor:
John F. Vasselin
by Munroe H. Hamilton
Attorney Dec. 4, 1951  J. F. VASSELIN  2,577,547
SHEAVE CONSTRUCTION
Filed Sept. 17, 1948  2 SHEETS—SHEET 2
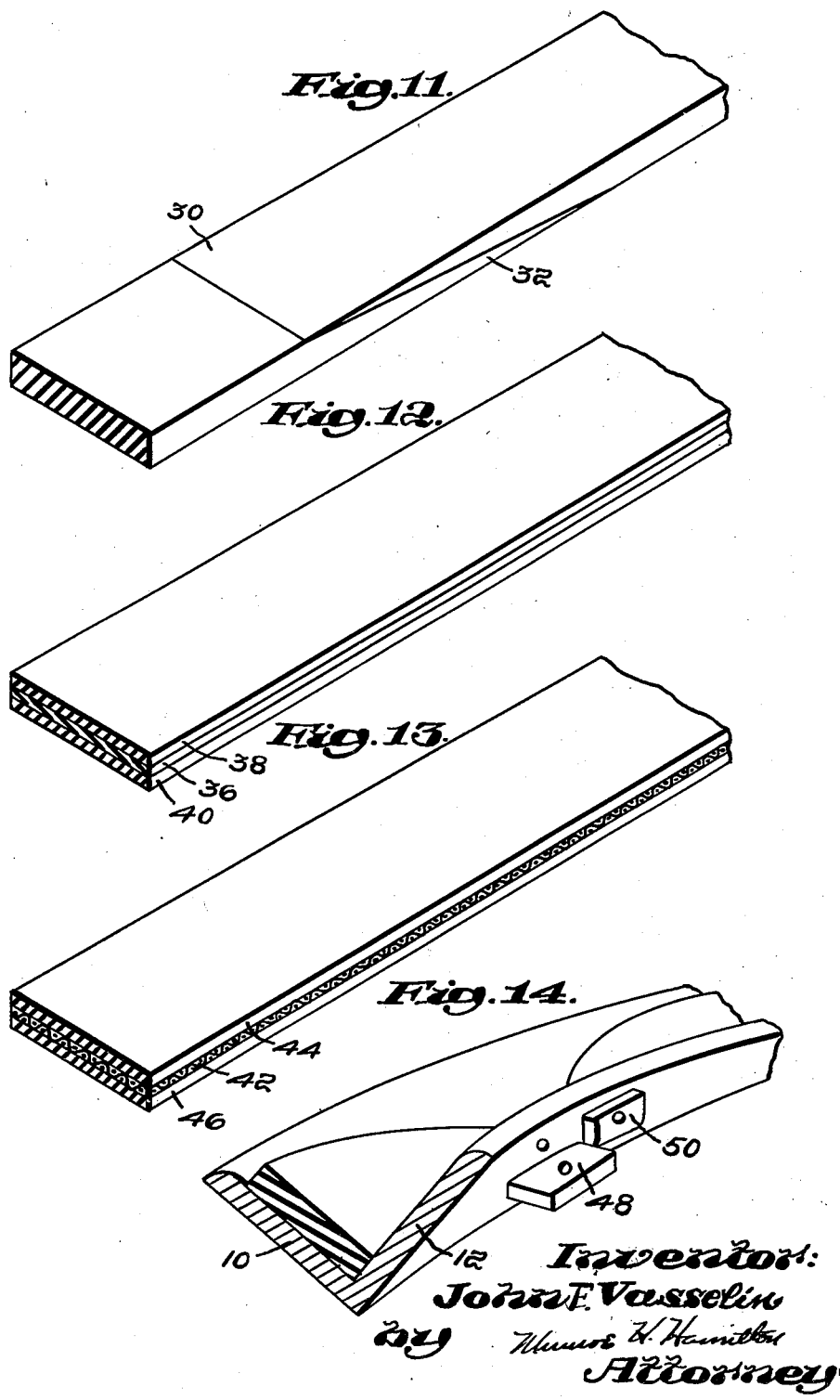

Patented Dec. 4, 1951

2,577,547

UNITED STATES PATENT OFFICE 2,577,547

SHEAVE CONSTRUCTION

John F. Vasselin, Westford, Mass., assignor to H. E. Fletcher Company, West Chelmsford, Mass., a corporation of Massachusetts Application September 17, 1948, Serial No. 49,837

6 Claims. (Cl. 74—230.7)

This invention relates to an improved sheave designed especially for use as a guide in changing the direction and point of application of a pulling force exerted for example along an endless wire body. In one preferred embodiment the invention is exemplified by a sheave for an endless carrier wire of the type employed in stone quarries and stone working plants in the course of stone sawing operations to carry or move an abrasive material into sliding contact with a surface of granite or other stone body. One form of wire saw for which the sheave of the invention is particularly adapted consists in a so-called helical wire formed of a thin strip of steel twisted about its longitudinal axis to provide continuous helical edges and intervening grooves for carrying abrasive. The invention however is not limited in its application to this or any other type of saw, wire or sheave construction.

It is a general object of the invention to provide an improved sheave construction which is efficient in operation, relatively inexpensive to manufacture and install, and capable of withstanding heavy loads maintained continuously for extended operating periods. It is a further object of the invention to devise a sheave and endless carrier wire arrangement which is suitable for use in carrying on wire sawing operations in stone quarries or other exposed localities at all seasons of the year and especially during the winter months in stormy cold weather when frequent exposure of the wire saw and sheave to snow and sleet is encountered.

It is found that in operating a wire saw during a snow or sleet storm, there is a pronounced tendency for snow and ice to gather on the wire guiding rim of the sheave, gradually becoming packed into a hard icy layer which soon fills the channel of the wire guiding rim, with the result that the saw is easily thrown out of the sheave or its movement impeded. It is a specific object of the invention therefore to deal with this problem.

The invention is further concerned with the general problem of wear which develops out of the operation of a helical wire saw, both as respects the wire guiding rim of the sheave and the helical wire itself. The wear problem on this type of wire saw is made particularly severe by small abrasive particles which are carried away by the wire from the point where the actual stone sawing is done, and tend to become deposited on all the sheaves in the system. It is essential to the abrading process that a very considerable tension be exerted in the wire and that sections of the wire be urged against a stone surface to be cut with considerable force. There is also at times a tendency for the wire saw to rotate about its longitudinal axis as it passes around the guiding rim of the sheave and since the saw material is necessarily a very hard, tough, high-tension steel, there develops a rather rapid deterioration of the helical edges of the saw if a comparatively hard wire guiding surface is employed in the sheave. If on the other hand the guiding surface is made too soft, wear proceeds rather rapidly to an extent such that more or less frequent repair or replacement of the guiding surface may be necessary, resulting in interruption of the cutting operation and a drop in quarry output.

The sheave construction of the present invention avoids a great deal of the difficulty from excessive wear and also furnishes one satisfactory answer to the problem of excessive ice formation on the wire guiding rim of a sheave. By employing in the sheave channel a liner of resilient character such as may be obtained with rubber or rubber-like substances of a suitable degree of hardness, it is found that a limited amount of cushioning effect or yieldability may be developed. As the liner yields and flexes in response to the stress of the wire saw, there occurs a distortion in the surface of the liner where ice tends to form, thus producing an unstable base which in turn causes ice deposited on the liner to become cracked and broken into tiny particles. When thus broken up, the ice is readily thrown off as the sheave rotates. An important feature of the invention therefore is the combination with a helical wire saw and suitable guiding sheave of a resilient liner construction which is of a hardness chosen to permit appreciable flexing in response to the stress of the wire saw and thus to constitute a de-icing channel.

Another important feature of the invention is the provision of a composite liner body in which the constituent parts are arranged in novel fashion with respect to one another and the sheave rim so as to facilitate interchangeability and permit wear to occur at a number of separated areas, with the result that the working life of the liner body is greatly increased and the cost of operation materially reduced.

These and other objects and novel features of the invention will be more fully understood and appreciated from the following description of a preferred embodiment shown in the accompanying drawings, in which Fig. 1 is an elevational view illustrating the sheave of the invention and also indicating a fragmentary portion of a helical wire saw engaged about the sheave;

Fig. 2 is a fragmentary perspective view of one of the resilient liner elements made use of in forming the composite liner body of the invention;

Fig. 3 is a fragmentary perspective view of a sheave rim illustrating the composite liner body mounted therein, with a helical wire saw supported in an operative position;

Fig. 4 is another perspective view similar to Fig. 3 and showing areas of wear produced in the liner by the helical wire saw;

Fig. 5 is still another perspective view similar to Figs. 3 and 4 and illustrating a change in the relative position of the liner elements;

Figs. 6 and 7 are cross-sectional views indicating still other changes which may be resorted to in the relative position of the liner elements;

Fig. 8 is a perspective view illustrating a single liner element with a series of worn areas such as may be produced by rearranging the element as noted in Figs. 5–7 inclusive;

Fig. 9 is a cross-sectional view illustrating another type of worn area which may be found in a liner element of the invention under some conditions of saw operation;

Fig. 10 is a cross-sectional view illustrating the use of a plurality of liner elements mounted one upon another;

Fig. 11 is a perspective view illustrating a liner secured with a lap joint;

Fig. 12 is a perspective view of a modified liner construction;

Fig. 13 is a perspective view of another form of liner; and

Fig. 14 is a perspective view showing fragmentarily a sheave rim and liner secured therethrough.

The improved sheave construction of the invention and its composite liner body has been devised having in mind especially wire sawing operations carried on in stone quarries for the purpose of cutting out large sections or blocks from deposits of the relatively harder classes of rock such as granite and the like. It is in such instances particularly where a helical wire saw furnishes one of the few known ways of successfully conducting the cutting operations. It is also helpful in reading the following description of the invention to visualize some of the limiting factors which are present in connection with the use of a helical wire saw. These saws necessarily exhibit reduced flexibility in comparison with wire saws made up of several twisted strands. As a result, the helical saw cannot be subjected to bending stresses such as are commonly undergone by multi-strand saw members and it becomes necessary to use greatly increased sheave diameters to avoid excessive bending. This in turn gives rise to the need for a fabricated frame type of sheave structure such as is indicated diagrammatically in Fig. 1 of the drawings.

As an instance of actual frame dimensions found to be satisfactory there may be cited a fabricated wheel having a diameter of five feet or slightly greater, and including a channeled rim surface adapted to handling a twisted steel strip running at speeds of approximately 4000 feet per minute in lengths ranging up to several thousand feet throughout which there is exerted a pulling force of tension of several hundred pounds. In addition the helical wire is frequently turning or rotating about its longitudinal axis, thus exerting on the sheave rim abrasive forces acting in a direction laterally as well as longitudinally of itself.

The more essential parts of a sheave such as noted above include a hub, radial supporting elements on which are mounted a channeled rim, and a composite liner body engaged around the channeled rim. It is inherent in the construction of the sheave of the invention that the sides of the rim extend outwardly away from one another in a substantially inclined manner, thus forming a wire guiding channel which decreases in width from its top to its bottom. Thus in Fig. 1 of the drawings, numeral 2 denotes the hub of the fabricated type sheave having radial supporting elements 4 about which is mounted a channeled rim 6. Numeral 8 refers to a wire saw of the helical type engaged in the rim of the sheave. The two broken ends of the saw shown in Fig. 1 are intended to indicate this member running to the commonly employed wire saw columns and driving motor equipment of well known character.

The rim 6 is more clearly shown in Fig. 3 and preferably is formed with a pair of sides 10 and 12 which are inclined with respect to one another and which extend outwardly to form a V-shaped channel. Mounted in this channel around the rim is a composite liner body made up of two endless liner elements 14 and 16 of resilient material such as rubber. The liner elements are preferably formed with a rectangular cross section and are stretched on over the rim and caused to resiliently grip respective sides 10 and 12 of the rim in a slidably engaged manner so that the liners are drawn inwardly of the channel into a position in which a lowermost edge 14a of liner 14 extends into contact with the opposite side 12 of the rim while the lowermost edge 16a of liner 16 rests against the upper surface of liner 14, as viewed in Fig. 3.

The two liner elements are composed of a resilient material whose yieldability is chosen to provide for a small amount of distortion when subjected to the stress of the wire saw 8, as already noted, so that movement of the saw will tend to break up ice accumulating in the channel. It is found that by thus providing a yieldable channel in a wheel or sheave which is rotating at the speed above noted, very little if any ice deposits form on rubber liners and the saw itself is maintained substantially free from films or lumps of ice.

The arrangement of the liners in the manner noted provides for a relatively large number of wear areas since the liners may be moved about on the sheave into different positions so that new or fresh areas of each liner are exposed to the wearing action of the saw. As will be observed in Fig. 3, the saw 8 assumes a position well down in the bottom of the channel and areas of wear will form at the region immediately adjacent or in contact with the saw at opposite side thereof. In the relative position shown in Fig. 3, wear will occur on line 16 along regions closely adjacent to the lower edge of this element whereas in liner 14 wear must occur along a region which is spaced from its lower edge by a distance equalling the thickness of liner 16. Liners worn in this manner are shown in Fig. 4.

The difference in the location of the wear points makes it possible to utilize each liner in a number of alternate positions, some of which have been indicated in Figs. 5, 6, and 7. Thus in Fig. 5 there is shown the liner 16 with its lowermost edge 16a extending into contact with the opposite side 10 of the channel and with the lowermost edge 14a of liner 14 resting against the upper surface of liner 16. In this way it will be apparent that the worn area 18 resulting from operation of the saw in a position such as that shown in Fig. 3, has become raised up out of the path of the saw 8 and a fresh surface of liner 14 is presented to receive one side of the saw. Similarly the opposite side of saw 8 bears against a fresh surface of line 16, while its worn area 20 has been slid downwardly to become covered up by liner 14 as shown in Fig. 5.

By reversing the position of the liners on the sides of the rim, i. e., by placing liner 16 on side 10 and liner 14 on side 12, as indicated in Figs. 6 and 7, in alternate position, it is possible to obtain two more fresh wearing surfaces on the same side of each liner, thus making a total of four wearing surfaces, assuming the width of the liner is slightly in excess of the total width encompassed by four worn areas. By then turning the liners inside out, the above procedure may be repeated in detail to furnish another four wearing areas brought into contact with the wire saw at separated intervals, in somewhat the manner illustrated in the worn liner shown in Fig. 8.

It is also found that a resilient type of liner is especially adapted for use with a wire saw and reduces materially the wear which may occur along the helical edges of the saw. The working life of a helical saw can therefore be greatly lengthened, which is an important factor in the cost of granite cutting operations.

The composite liner body may also include more than two component parts, as for example four component liners 22, 24, 26 and 28, superimposed one upon another in the manner illustrated in Fig. 10 or in some other suitable way. In this connection it may also be desired to alter or vary the characteristics of some of the liners so that for instance some of the liners will be held under a smaller degree of tension than others.

It is also found that the greater the degree of tension in the liner member, the more rapidly will wear of the liners take place and accordingly it is a further feature of the invention to provide liners whose tension may be held at a minimum. In some cases, it may be desired to secure the liner with lapped joints such as have been illustrated by the lapped portions 30 and 32 in Fig. 11. It may also be desired to provide a more complex type of liner such as that shown in Fig. 12, in which is illustrated a central band 36 which is covered at upper and lower sides by liner portions 38 and 40 applied without tension to the central band 36, while the latter member is in a stretched condition.

Still another arrangement may consist in using a non-resilient central cord material or strip 42, bearing rubber liner portions 44 and 46 at either side thereof, as shown in Fig. 13. Any of the foregoing forms of liner may if desired be secured in the rim by means of spaced-apart ends 48 and 50, secured through openings in the rim as suggested in Fig. 14.

Having thus disclosed my invention and described in detail illustrative embodiments thereof, I claim as new and desire to secure by Letters Patent:

1. An improved sheave including a rim, a pair of resilient interchangeable liner elements located one against another in the rim, the liner elements extending upwardly to form a V-shaped channel, those sections of the liner elements occurring at the bottom of the rim overlapping one another at an angle which intersects the plane of rotation of the sheave.

2. An improved sheave presenting a channeled rim, a plurality of resilient interchangeable liners supported in the channel in an oppositely inclined manner, adjacent edges of the liners overlapping one another along junction planes which extend at an angle to the plane of rotation of the sheave.

3. An improved sheave construction comprising a wheel member having a channeled rim, a resilient liner member angularly supported on one of the sides of the channeled rim and extending into contact with the other of the sides of the rim, the liner presenting relatively wide bearing surfaces and relatively narrow edges, a second resilient liner corresponding in shape to the first liner and being supported on the rim in opposed relation to the said first liner, one edge of the second resilient liner resiliently bearing against a relatively wide bearing surface of the first liner.

4. An improved sheave including a channeled rim having inwardly converging sides and a plurality of interchangeable liner elements resiliently secured over the sides, the liner elements consisting of resilient bands presenting flat edges arranged in overlapping relation with respect to one another, a flat bearing edge of one liner resiliently urged against the side of the channeled rim, and an adjacent flat bearing edge of the other liner resiliently urged against a relatively wide surface of the said first element, the two liners in the relative arrangement described cooperating to form a secondary V-shaped channel which is offset with respect to the channel of the rim.

5. An improved sheave presenting a rim having inwardly extending sides which define a channel, a plurality of interchangeable resilient liner elements arranged in overlapping relation between the sides, the junction of overlapping portions of respective liner elements occurring at an angle to the plane of rotation of the sheave.

6. An improved sheave including a rim, interchangeable resilient liners mounted against the rim under tension, a lowermost edge of one of the liners lying in contact with the uppermost surface of the other liner to define a V-shaped channel the bottom of which is offset with respect to the bottom of the channel of the rim.

JOHN F. VASSELIN.

REFERENCES CITED

The following references are of record in the file of this patent:

UNITED STATES PATENTS

| Number | Name | Date |
|---|---|---|
| 334,998 | Wardwell | Jan. 26, 1886 |
| 432,701 | Grimm | July 22, 1890 |
| 1,603,671 | Epton | Oct. 19, 1926 |
| 2,158,629 | Lansing | May 16, 1939 |

FOREIGN PATENTS

| Number | Country | Date |
|---|---|---|
| 17,854 | Great Britain | Oct. 15, 1903 |